US012657462B2

(12) United States Patent
Lee et al.

(10) Patent No.:     US 12,657,462 B2
(45) Date of Patent:     Jun. 16, 2026

(54) METHOD AND DEVICE FOR TRAINING NEURAL NETWORK MODEL

(71) Applicant: EL ROI LAB INC., Seoul (KR)

(72) Inventors: Jungi Lee, Seoul (KR); Ji Seong Yoon, Seoul (KR); Myoung Hwan Kim, Seoul (KR); Jeong Hyeon Park, Seoul (KR); Kwangsun Yoo, Incheon (KR); Seok Joo Byun, Gyeonggi-do (KR)

(73) Assignee: EL ROI LAB INC., Seoul (KR)

( * ) Notice: Subject to any disclaimer, the term of this patent is extended or adjusted under 35 U.S.C. 154(b) by 0 days.

(21) Appl. No.: 19/204,644

(22) Filed: May 12, 2025

(65)          Prior Publication Data
     US 2025/0348733 A1     Nov. 13, 2025

(30)          Foreign Application Priority Data
   May 10, 2024     (KR) ......................... 10-2024-0061723

(51) Int. Cl.
     *G06N 3/08*          (2023.01)
(52) U.S. Cl.
     CPC ...................................... *G06N 3/08* (2013.01)
(58) Field of Classification Search
     CPC ................................... G06N 3/08; G06N 3/09
     See application file for complete search history.

(56)          References Cited

U.S. PATENT DOCUMENTS

| | | | |
|---|---|---|---|
| 2022/0292345 A1* | 9/2022 | Barsopia | G06N 3/08 |
| 2022/0309779 A1* | 9/2022 | Wang | G06N 3/08 |
| 2024/0330746 A1* | 10/2024 | Inzelberg | G06N 20/00 |

FOREIGN PATENT DOCUMENTS

| | | |
|---|---|---|
| KR | 10-2021-0107491 A | 9/2021 |
| KR | 10-2023-0163183 A | 11/2023 |

OTHER PUBLICATIONS

Panigrahi et al., "Comparing Importance Sampling Based Methods for Mitigating the Effect of Class Imbalance," Feb. 2024, arXiv:2402. 18742v1 (Year: 2024).*
Fogarty et al., 2017, https://saestatsteaching.tech/section-varianceratio (Year: 2017).*
Hendrycks et al., "Deep Anomaly Detection with Outlier Exposure," 2019, arXiv:1812.04606v3 (Year: 2019).*
(Continued)

*Primary Examiner* — Michael J Huntley
*Assistant Examiner* — Incent Anton Spraul
(74) *Attorney, Agent, or Firm* — Nicholas Park

(57)          ABSTRACT

A method of training a neural network model, performed by a neural network model training device, may include selecting, from a population of input data, an initial sample group to be used as training data of the neural network model; determining a final sample group by adding distribution difference data included in the population to the initial sample group; determining a final loss function corresponding to a loss function of the final sample group using the distribution of the final sample group and the distribution of the population; and receiving the final sample group as the training data, and training the neural network model by applying the final loss function.

2 Claims, 6 Drawing Sheets

(56)　　　　　　References Cited

OTHER PUBLICATIONS

Geonwoo Ko et al., "Comparative study of unsupervised 25 anomaly detection in sensor data," Journal of the Korean Data & Information Science Society, vol. 34, No. 4, pp. 619-634, Jul. 2023.
KIPO, Notice of Refusal to Grant a Patent for Korean Patent Application No. 10-2024-0061723, Jul. 1, 2024.
KIPO, Decision to Grant a Patent for Korean Patent Application No. 10-2024-0061723, Jan. 21, 2025.

* cited by examiner

METHOD AND DEVICE FOR TRAINING NEURAL NETWORK MODEL

CROSS-REFERENCE TO RELATED APPLICATION(S)

This application claims priority from and the benefit of Korean Patent Application No. 10-2024-0061723 filed on May 10, 2024, which is hereby incorporated by reference in its entirety.

BACKGROUND

Technical Field

The following example embodiments relate to a method and device for training a neural network model.

Related Art

Machine learning refers to a type of artificial intelligence (AI) that allows a computer to perform prediction tasks, such as regression, classification, and clustering, based on what the computer has learned on its own based on data.

Deep learning refers to a field of machine learning that teaches a computer how humans think and may be defined as a set of machine learning algorithms that attempt to achieve high-level abstraction (task of summarizing key content or function from a large amount of data or complex data) through a combination of various nonlinear transformation methods.

A deep learning structure is a concept that is designed based on artificial neural networks (ANNs). The artificial neural network refers to an algorithm that mathematically models virtual neurons and then simulates them to have learning capability similar to the human brain, and is mainly used for pattern recognition. An artificial neural network model used for deep learning has a structure that is constructed by repeatedly performing linear fitting and nonlinear transformation or activation. The neural network model used for deep learning may include a deep neural network (DNN), a convolutional neural network (CNN), a recurrent neural network (RNN), a restricted Boltzmann machine (RBM), a deep belief network (DBN), and deep Q-networks.

In a training process of deep learning, parameters may be optimized by inputting training data to the artificial neural network model.

Meanwhile, hyperspectral technology refers to utilizing a hyperspectral sensor to disassemble and digitize light in detail, including not only visible light that a human may see, but also infrared ray and ultraviolet ray that the human may not see, and is widely used in various fields such as defect detection and quality management.

Hyperspectral data acquired through the hyperspectral sensor contains spectral information on an object corresponding to each pixel of an image through spectrum of incident light, and many similar spectra are present in this spectral information.

Therefore, in the case of using all hyperspectral data for training the neural network model as training data, repetitive training using duplicate spectral information may be performed and this repetitive training may cause a significantly large amount of training time to be consumed.

SUMMARY

At least one example embodiment provides a method and device for training a neural network model.

At least one example embodiment provides a method and device for training a neural network model that uses data containing many similar spectra, such as hyperspectral data, as input data.

However, subjects to be achieved by the present invention are not limited to those described above, and still other subjects not described herein will be clearly understood by one of ordinary skill in the art to which the present invention pertains from the following description.

According to an example embodiment, there is provided a method of training a neural network model, performed by a neural network model training device, the method including selecting, from a population of input data, an initial sample group to be used as training data of the neural network model; determining a final sample group by adding distribution difference data included in the population to the initial sample group; determining a final loss function corresponding to a loss function of the final sample group using the distribution of the final sample group and the distribution of the population; and receiving the final sample group as the training data, and training the neural network model by applying the final loss function.

The determining of the final sample group may include determining an outlier score of data included in the population; and determining the distribution difference data among the data included in the population based on the outlier score.

The method may further include initially training the neural network model using the initial sample group, and the determining of the final loss function may include determining the final loss function by applying an operation for the distribution of the final sample group and the distribution of the population to an initial loss function used in the initial training stage.

The determining of the final loss function by applying to the initial loss function may include calculating a weight using a difference between the distribution of the final sample group and the distribution of the population; and determining the final loss function by multiplying the initial loss function by the weight.

The calculating of the weight may include calculating the weight by applying an importance sampling weight loss method to the distribution of the final sample group and the distribution of the population.

The input data may include hyperspectral data.

According to another example embodiment, there is provided a neural network model training device including a memory configured to store a neural network model training program for training a neural network model; and a processor configured to control the memory, wherein the processor is configured to select, from a population of input data, an initial sample group to be used as training data of the neural network model, to determine a final sample group by adding distribution difference data included in the population to the initial sample group, to determine a final loss function corresponding to a loss function of the final sample group using the distribution of the final sample group and the distribution of the population, and to receive the final sample group as the training data, and train the neural network model by applying the final loss function.

The processor may determine an outlier score of data included in the population, and may determine the distribution difference data among the data included in the population based on the outlier score.

The processor may initially train the neural network model using the initial sample group, and may determine the final loss function by applying an operation for the distribution of the final sample group and the distribution of the population to an initial loss function used in the initial training stage.

The processor may calculate a weight using a difference between the distribution of the final sample group and the distribution of the population, and may determine the final loss function by multiplying the initial loss function by the weight.

The processor may calculate the weight by applying an importance sampling weight loss method to the distribution of the final sample group and the distribution of the population.

According to example embodiments, by adding distribution difference data to an initial sample group selected from a population to acquire training data and by modifying a loss function using the probability distribution of the population and the probability distribution of a final sample group, an amount of time required to train a neural network model may be significantly reduced while ensuring the same level of performance as a case of training the neural network model by inputting the population.

Effects achievable from the present disclosure are not limited to those described above and other effects not described herein may be clearly understood by one of ordinary skill in the art from the following description.

BRIEF DESCRIPTION OF THE FIGURES

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect.

DETAILED DESCRIPTION

The advantages and features of the present invention and the methods for achieving the same will become apparent with example embodiments described in detail below with reference to the accompanying drawings. However, the present invention is not limited to the example embodiments disclosed below and may be implemented in various different forms, and the example embodiments are simply provided to complete the disclosure of the present invention and to fully inform one of ordinary skill in the art of the scope of the invention and the present invention is defined by the scope of the claims.

When it is determined that detailed description related to a known function or configuration may unnecessarily obscure the gist of the present invention in describing example embodiments of the present invention, the detailed description will be omitted. The terms described below are terms defined in consideration of functions in the example embodiments of the present invention and may vary depending on intent of a user or an operator, custom, and the like. Therefore, the definition needs to be made based on the contents throughout the present specification.

Figure 1:
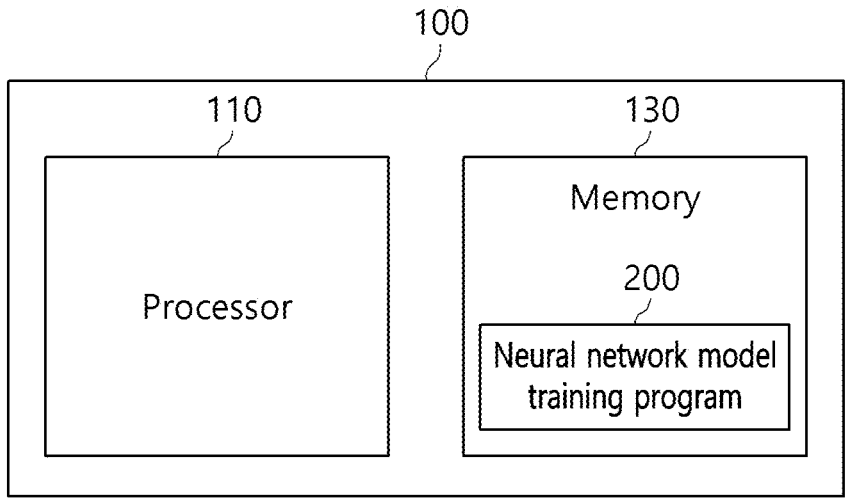
FIG. 1 is a block diagram illustrating a neural network model training device according to an example embodiment.

FIG. 1 is a block diagram illustrating a neural network model training device according to an example embodiment.

Referring to FIG. 1, a neural network model training device 100 relates to training a neural network model (e.g., neural network model that uses data with many similar spectra, such as hyperspectral data, as input data) and may include a processor 110 and a memory 130.

The processor 110 may control the overall operation of the neural network model training device 100.

The memory 130 may store a neural network model training program 200 and information required to execute the neural network model training program 200.

Herein, the neural network model training program 200 may represent software that includes instructions programmed to train the neural network model using data with many similar spectra, such as hyperspectral data, as input data.

To execute the neural network model training program 200, the processor 110 may load the neural network model training program 200 and information required to execute the neural network model training program 200 from the memory 130.

The processor 110 may train the neural network model by executing the neural network model training program 200.

The function and/or operation of the neural network model training program 200 will be described in detail with reference to FIG. 2.

Figure 2:
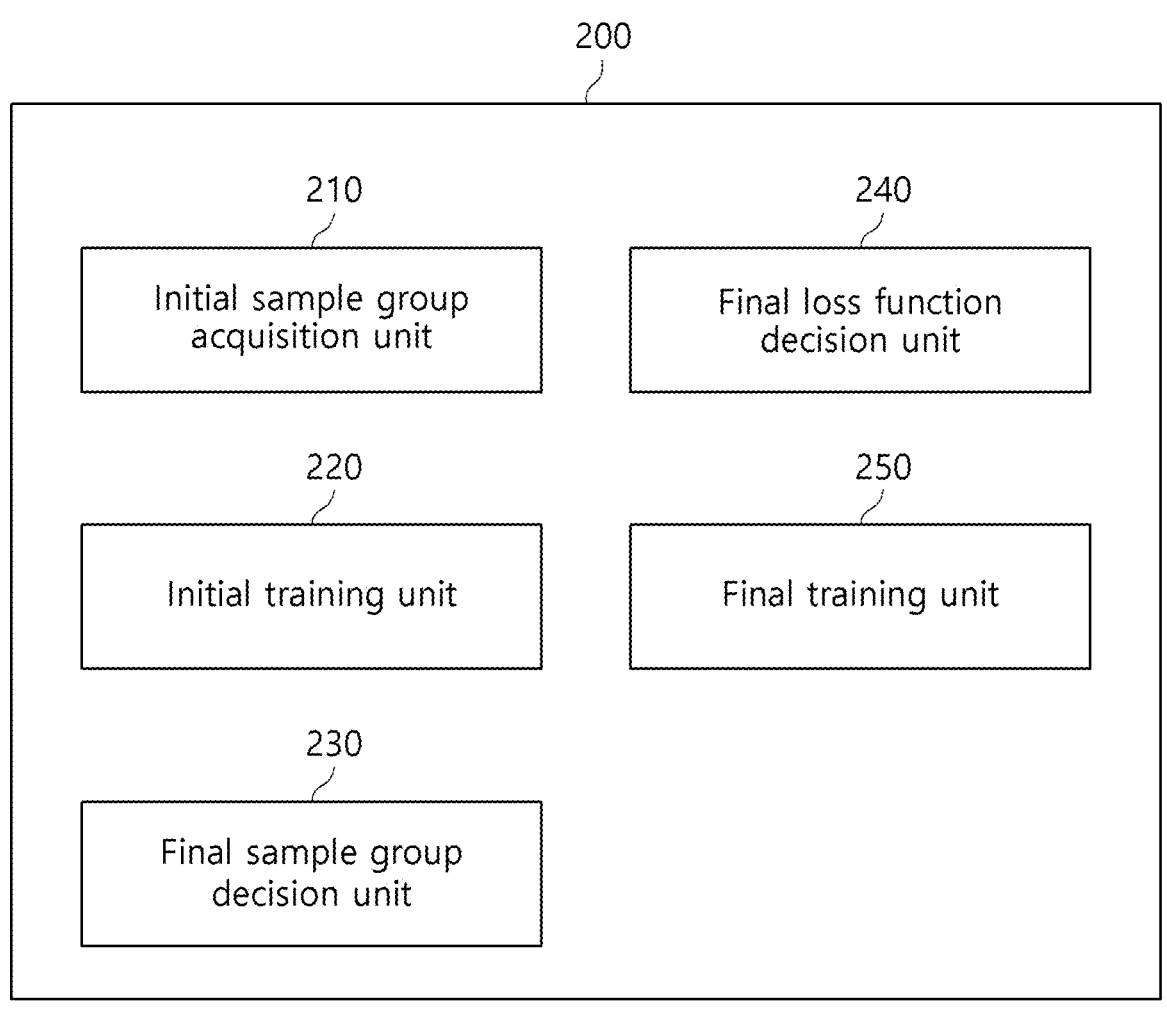
FIG. 2 is a block diagram conceptually illustrating the function of a neural network model training program according to an example embodiment.
Figure 3:
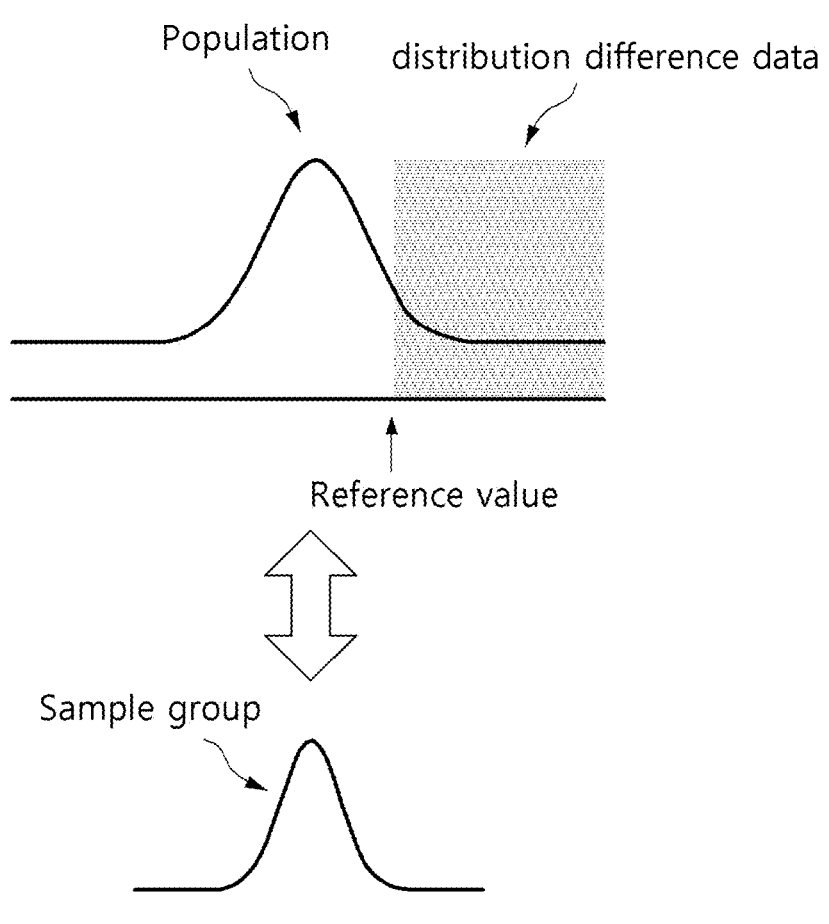
FIG. 3 illustrates graphs showing outlier data of a population and initial sample group.

FIG. 2 is a block diagram conceptually illustrating the function of a neural network model training program according to an example embodiment, and FIG. 3 illustrates graphs showing outlier data of a population and an initial sample group.

Referring to FIG. 2, a neural network model training program 200 may include an initial sample group acquisition unit 210, an initial training unit 220, a final sample group decision unit 230, a final loss function decision unit 240, and a final training unit 250.

The initial sample group acquisition unit 210, the initial training unit 220, the final sample group decision unit 230, the final loss function decision unit 240, and the final training unit 250 shown in FIG. 2 are acquired by conceptually dividing the function of the neural network model training program 200, to easily explain the function of the neural network model training program 200, and is not limited thereto. Depending on example embodiments, the function of each of the initial sample group acquisition unit 210, the initial training unit 220, the final sample group decision unit 230, the final loss function decision unit 240, and the final training unit 250 may be merged/separated, and may be implemented as a series of instructions included in a single program.

The initial sample group acquisition unit 210 may select partial data (hereinafter, referred to as initial sample group) to be used as training data of the neural network model from the entire data (hereinafter, referred to as population) corresponding to input data of the neural network model.

Depending on example embodiments, the initial sample group acquisition unit 210 may select the initial sample group from the population through a random sampling method.

The initial sample group acquisition unit 210 may select a proportion (or number) for selecting the initial sample group from the population based on a user selection or a preset selection criterion. For example, the user selection or the preset selection criterion may be determined based on whether the number of initial sample groups is small while the training accuracy of the neural network model is high. This is because an amount of time (cost) used for training may be less according to a decrease in the number of initial sample groups.

The initial training unit 220 may train the neural network model using the selected initial sample group.

A method of training, by the initial training unit 220, the neural network model may be determined based on a type and a purpose of the neural network model. Therefore, herein, a training method of the neural network model is not limited.

The final sample group decision unit 230 may determine a final sample group using distribution difference data (which may also be referred to as outlier data depending on example embodiments) included in the population.

In detail, the final sample group decision unit 230 may add the distribution difference data included in the population to the initial sample group and may determine the initial sample group to which the distribution difference data is added as the final sample group. Here, the distribution difference data (or, outlier data) may represent data representing difference with other data among data within the population (e.g., data that deviates from the average of the population by preset reference or more). Depending on example embodiment, the distribution difference data may be determined based on a difference between an outlier score and a preset reference value. The final sample group decision unit 230 may add the distribution difference data to the initial sample group and may include, in the final sample group, population data that is not expressed by the initial sample group as data accordingly.

Depending on example embodiments, the final sample group decision unit 230 may determine the outlier score of data included in the population, may determine the distribution difference data based on the determined outlier score, may add the distribution difference data to the initial sample group, and may determine the initial sample group to which the distribution difference data is added as the final sample group.

This is because, in the case of the neural network model that uses data with many spectra data, such as hyperspectral data, as input data, outlier data not similar to general data does not need to be included in training data to improve accuracy of training.

For example, further referring to FIG. 3, an upper graph may show the variance of outlier scores of the population and a lower graph may show the variance of outlier scores of the initial sample group. In the upper graph and the lower graph of FIG. 3, the horizontal axis represents the outlier score and the vertical axis represents the quantity of data.

Therefore, distribution difference data may be data of which outlier score is greater than or equal to the preset reference value, and the final sample group decision unit 230 may add the distribution difference data to the initial sample group.

Meanwhile, the final sample group decision unit 230 may calculate the outlier score based on a difference between the population and output (i.e., data restored from the population) when inputting the population into the neural network model (or, another model), but is not limited thereto. That is, depending on example embodiments, the outlier score may be determined through various methods capable of calculating a difference between data included in the population.

The final loss function decision unit 240 may determine a final loss function corresponding to a loss function of the final sample group using the distribution of the initial sample group and the distribution of the population.

In detail, the final loss function decision unit 240 may calculate a weight using a difference (or ratio) between the distribution of the initial sample group and the distribution of the population and may determine the final loss function by applying the weight to an initial loss function used when the initial training unit 220 trains the neural network model using the initial sample group. For example, the final loss function decision unit 240 may determine the final loss function by multiplying the initial loss function by the weight.

This is to increase the accuracy of training by correcting (reflecting) a difference between the population and the initial sample group for final training.

Depending on example embodiments, the final loss function decision unit 240 may calculate the weight using an importance sampling weight loss method. For example, the final loss function decision unit 240 may calculate the weight using Equation 1 below.

$$E_p[L(x)] = \int L(x)p(x)dx \qquad \text{[Equation 1]}$$
$$= \int L(x)\frac{p(x)}{q(x)}q(x)dx$$
$$= E_q\left[L(x)\frac{p(x)}{q(x)}\right]$$

Here, L denotes the initial loss function, p denotes the variance of the population, q denotes the variance of the final sample group, and E denotes a backpropagation value.

As shown in Equation 1, the weight may be calculated using a ratio between the distribution of the sample group and the distribution of the population, and the final loss function may be determined as a value acquired by multiplying the initial loss function by the weight. Therefore, since a backpropagation value $(E_q)$ for the final loss function is the same as a backpropagation value $(E_p)$ of the population, the accuracy of training may be ensured although the neural network model training program 200 trains the neural network model using the final loss function.

The final training unit 250 may receive the final sample group as training data and may retrain the neural network model by applying the final loss function as the backpropagation value.

Herein, for clarity of description, it is described that the initial training unit 220 and the final training unit 250 are separate components, but are not limited thereto. That is, depending on example embodiments, the initial training unit 220 and the final training unit 250 may be implemented as a single training unit that performs the function of training the neural network model.

Figure 4:
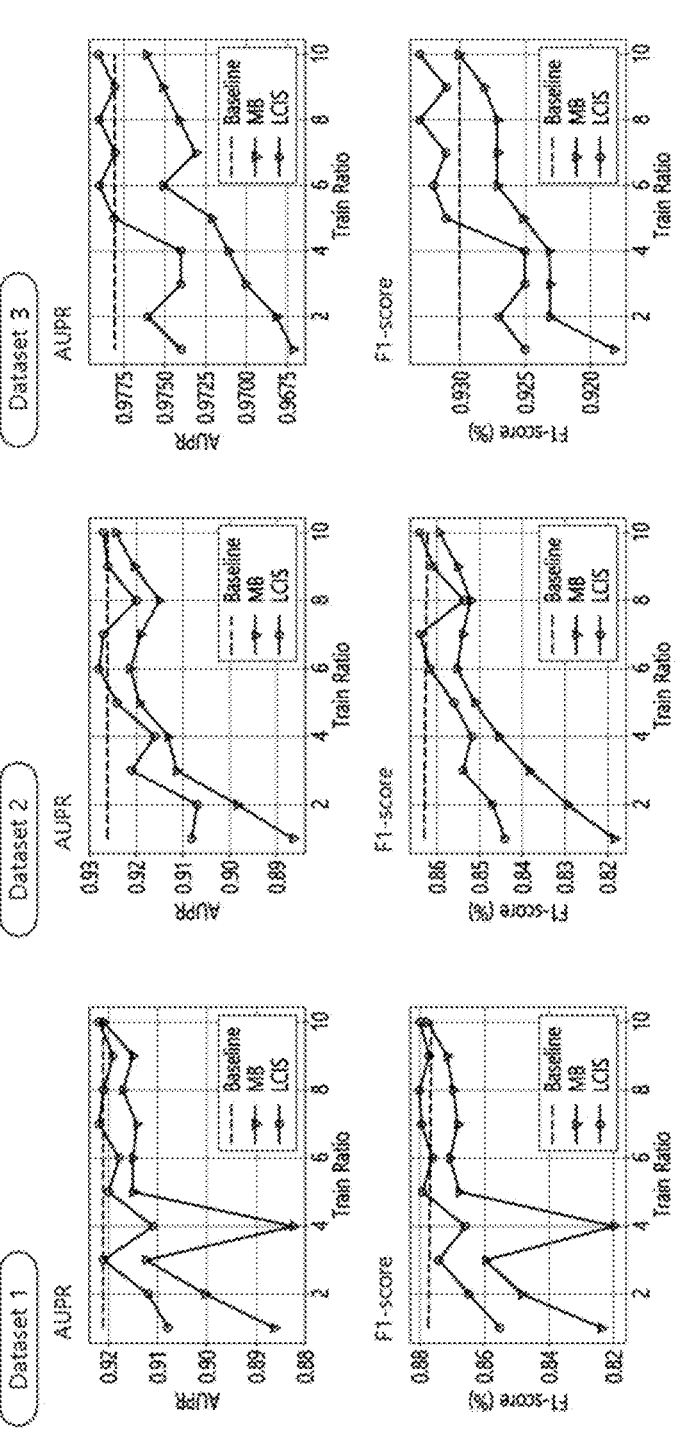
FIG. 4 illustrates graphs showing accuracy of training for each proportion of a sample group when training a neural network model using a neural network model training device according to an example embodiment.
Figure 5:
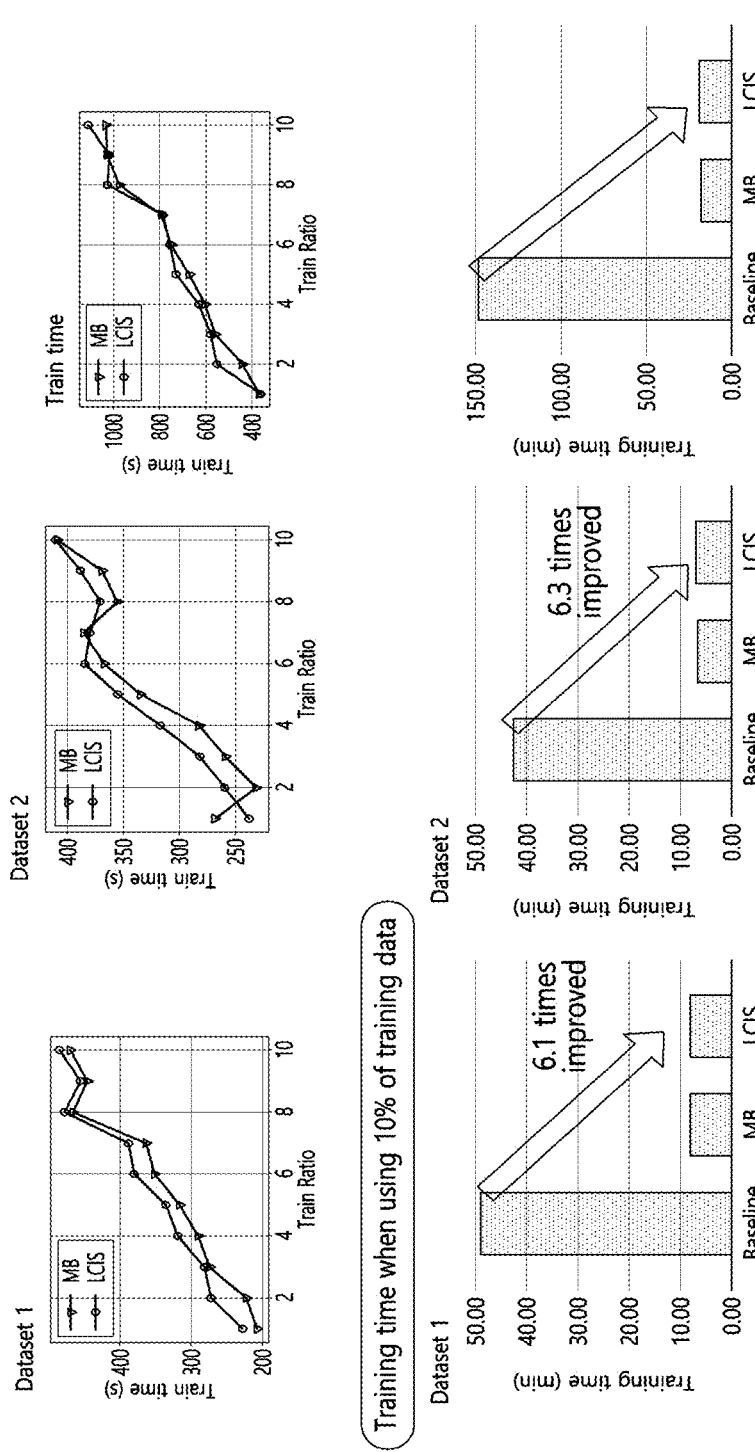
FIG. 5 illustrates graphs showing the effect of training a neural network model using a neural network model training device according to an example embodiment.

FIG. 4 illustrates graphs showing accuracy of training for each proportion of a sample group when training a neural network model using a neural network model training device according to an example embodiment, and FIG. 5 illustrates graphs showing the effect of training a neural network model using a neural network model training device according to an example embodiment.

In FIGS. 4 and 5, "Baseline" represents a case of training the neural network model using the population, "MB" (modified baseline) represents a case of extracting only a sample group from the population and training the neural network model without modifying the initial sample group as the final sample group as in the method according to an example embodiment, and "LCIS" represents a case of training the neural network model using the neural network model training device according to an example embodiment.

Referring to FIG. 4, in FIG. 4, the horizontal axis represents a sample group extraction ratio and the vertical axis represents the performance of the trained neural network model measured through Area Under Precision Recall (AUPR) and F1-score.

As shown in FIG. 4, as the sample group (initial sample group) extraction ratio increases in LCIS, it almost approaches the performance of Baseline. In the case of selecting 10% of the population as the initial sample group, it can be seen that LCIS has almost the same performance as the performance of Baseline, or exhibits better performance than Baseline depending on the type of dataset.

Also, it can be seen that LCIS shows better training performance than MB at all times, regardless of the sample group extraction ratio.

Also, referring to FIG. 5, it can be seen that LCIS has almost the same training time as MB regardless of the type of dataset. In the case of selecting 10% of the population as the initial sample group, it can be seen that LCIS may reduce the training time by more than 6 times compared to Baseline.

Figure 6:
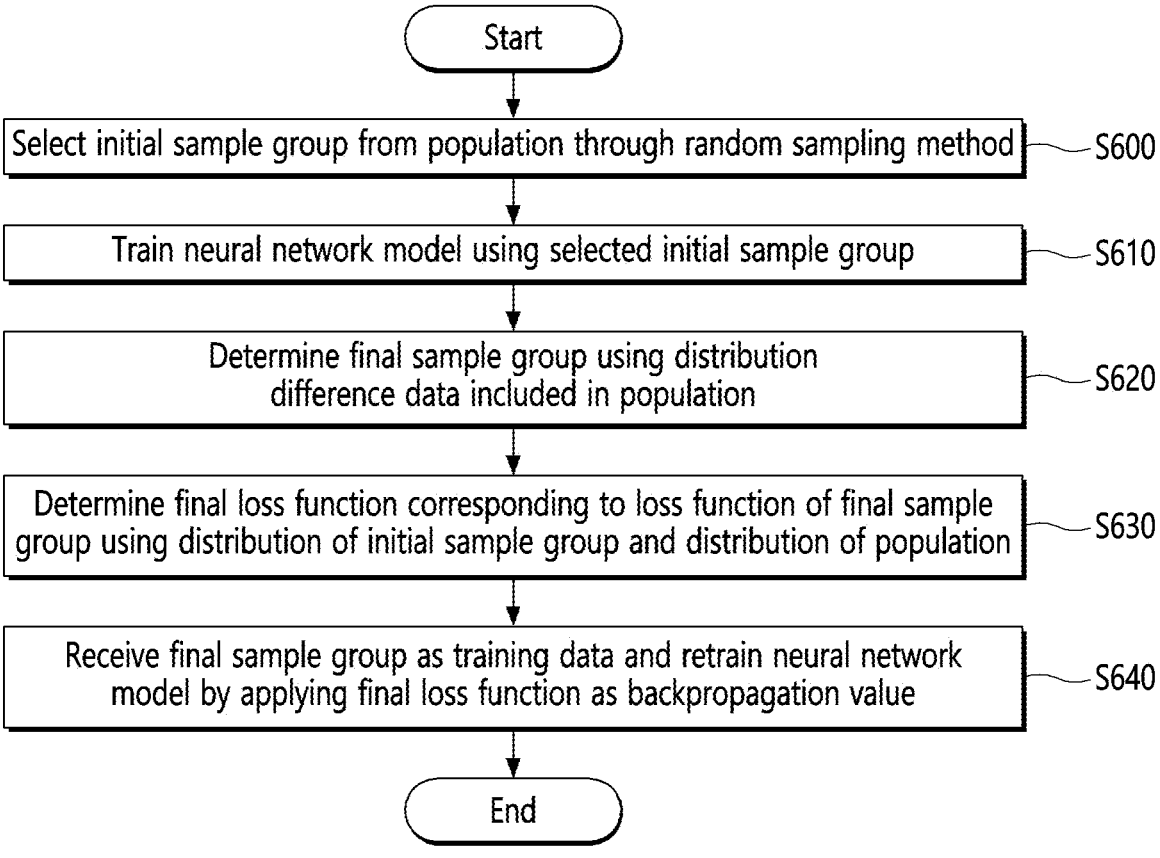
FIG. 6 is a flowchart illustrating a method of training a neural network model using a neural network model training program according to an example embodiment.

FIG. 6 is a flowchart illustrating a method of training a neural network model using a neural network model training program according to an example embodiment.

Referring to FIGS. 2 and 6, depending on example embodiments, the initial sample group acquisition unit 210 may select an initial sample group from a population through a random sampling method in operation S600, and the initial training unit 220 may train the neural network model using the selected initial sample group in operation S610.

In operation S620, the final sample group decision unit 230 may determine a final sample group using distribution difference data included in the population.

In operation S630, the final loss function decision unit 240 may determine a final loss function corresponding to a loss function of the final sample group using the distribution of the initial sample group and the distribution of the population. In operation S640, the final training unit 250 may receive the final sample group as training data and may retrain the neural network model by applying the final loss function as a backpropagation value.

According to an example embodiment, by adding distribution difference data to an initial sample group selected from a population to acquire training data and by modifying a loss function using the probability distribution (e.g., variance) of the population and the probability distribution (e.g., variance) of a final sample group, an amount of time used to train a neural network model may be significantly reduced while ensuring the same level of performance as a case of training the neural network model by inputting the population.

Combinations of the respective blocks of the block diagram and the respective operations of the flowchart attached herein may be performed by computer program instructions.

The computer program instructions may be embedded in an encoding processor of a general-purpose computer, a special-purpose computer, or other programmable data processing equipment. Therefore, the instructions performed through an encoding processor of the computer or other programmable data processing equipment generate methods of performing functions described in the respective blocks of the block diagram or the respective operations of the flowchart. The computer program instructions may also be stored in a computer-available or computer-readable memory that may direct the computer or other programmable data processing equipment to implement the function with a specific method. Therefore, the instructions stored in the computer-available or computer-readable memory may also product a manufacture item that includes an instruction method for performing a function described in each block of the block diagram or each operation of the flowchart. Since the computer program instructions may also be installed on the computer or other programmable data processing equipment, instructions for performing the computer or other programmable data processing equipment in such a manner that a series of operations are performed on the computer or other programmable data processing equipment may provide operations for executing functions described in the respective blocks of the block diagram and the respective operations of the flowchart.

Also, each block or each operation may represent a portion of a module, a segment, or a code that includes one or more executable instructions for executing specified logical function(s). Also, in some alternative example embodiments, it should be noted that functions described in blocks or operations may occur out of order. For example, two blocks or operations illustrated in succession may be substantially performed at the same time, or the blocks or the operations may sometimes be performed in reverse order depending on a corresponding function.

The above description is simply an example of the technical spirit of the present invention and one skilled in the art will appreciate that various modifications and alterations may be made to the example embodiments without departing from the technical spirit of the present invention. Therefore, the example embodiments disclosed herein are not intended to limit the technical spirit of the present invention but to explain it, and the scope of the technical spirit of the present invention is not limited by the example embodiments. The protection scope of the present invention should be interpreted by the claims and all the technical spirit that falls within the equivalent scope thereof should be interpreted to be included in the scope of rights of the present invention.

What is claimed is:

1. A method of training a neural network model, performed by a neural network model training device, the method comprising:

selecting, from a population of input data, an initial sample group to be used as training data of the neural network model;

initially training the neural network model using the initial sample group, determining a final sample group by adding outlier data to the initial sample group, wherein the outlier data is data from the population that deviates from the average of the population by a preset reference or more;

determining a final loss function corresponding to a loss function of the final sample group using the distribution of the final sample group and the distribution of the population; and receiving the final sample group as the training data, and training the neural network model by applying the final loss function, wherein the determining of the final loss function comprises determining the final loss function by applying an operation for the distribution of the final sample group and the distribution of the population to an initial loss function used in the initial training stage, and the determining of the final loss function by applying to the initial loss function comprises:

calculating a weight using a ratio between the distribution of the final sample group and the distribution of the population; and determining the final loss function by multiplying the initial loss function by the weight, wherein the calculating of the weight comprises calculating the weight as $p(x)/q(x)$, wherein the $p(x)$ denotes the variance of the population, and the $q(x)$ denotes the variance of the final sample group.

2. A neural network model training device comprising:

a memory configured to store a neural network model training program for training a neural network model; and a processor configured to control the memory, wherein the processor is configured to, select, from a population of input data, an initial sample group to be used as training data of the neural network model, initially train the neural network model using the initial sample group, determine a final sample group by adding outlier data to the initial sample group, wherein the outlier data is data from the population that deviates from the average of the population by a preset reference or more, determine a final loss function corresponding to a loss function of the final sample group using the distribution of the final sample group and the distribution of the population, and receive the final sample group as the training data, and train the neural network model by applying the final loss function, wherein the processor is configured to, determine the final loss function by applying an operation for the distribution of the final sample group and the distribution of the population to an initial loss function used in the initial training stage, wherein the processor is configured to, calculate a weight using a ratio between the distribution of the final sample group and the distribution of the population, and determine the final loss function by multiplying the initial loss function by the weight, wherein the processor is configured to, calculate the weight as $p(x)/q(x)$, wherein the $p(x)$ denotes the variance of the population, and the $q(x)$ denotes the variance of the final sample group.

* * * * *